United States Patent
Martin et al.

(10) Patent No.: US 7,750,095 B2
(45) Date of Patent: Jul. 6, 2010

(54) SYSTEM AND METHOD FOR REDUCING FOULING IN A REACTOR

(75) Inventors: Joel L. Martin, Bartlesville, OK (US); Jim B. Askew, Barnsdall, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 63 days.

(21) Appl. No.: 12/229,392

(22) Filed: Aug. 22, 2008

(65) Prior Publication Data
US 2010/0048837 A1 Feb. 25, 2010

(51) Int. Cl.
C08F 2/00 (2006.01)
B01J 19/18 (2006.01)
C23C 22/00 (2006.01)

(52) U.S. Cl. .............................. 526/62; 526/64; 526/74
(58) Field of Classification Search ................ 526/62, 526/64, 74; 148/283
See application file for complete search history.

(56) References Cited

U.S. PATENT DOCUMENTS

| | | | | |
|---|---|---|---|---|
| 2,878,109 A | * | 3/1959 | Wood et al. | 44/444 |
| 5,548,040 A | * | 8/1996 | Cann et al. | 526/62 |
| 6,114,475 A | * | 9/2000 | Goode et al. | 526/62 |
| 6,511,760 B1 | | 1/2003 | Barone et al. | |

FOREIGN PATENT DOCUMENTS

EP 0709635 5/1996

OTHER PUBLICATIONS

Erley, D.S., "2,2-Dimethoxypropane as a Drying Agent for Preparation on Infrared Samples," Analytical Chemistry, 1957, vol. 29, No. 10, p. 1564.
Kerber, Susan J., et al., "Stainless Steel Surface Analysis," Advanced Materials & Processes, Nov. 2000, pp. 33-36.
Kesslin, George, et al., "Ortho Esters as Water Scavengers," I&EC Product Research and Development, Mar. 1966, vol. 5, No. 1, pp. 27-29.
Lorette, N. B., et al., Preparation of Ketals from 2,2-Dimethoxypropaine, Apr. 1960, vol. 25, pp. 521-525.
Restek Performance Coatings, Applications Note: Improve Moisture Dry-Down and Corrosion Resistance, 2005, pp. 2.
Siefering, K. L., et al., Surface and Films, Journal Vac. Sci. & Tech. A: Vac., 1994, vol. 12, No. 5, pp. 2685-2691.
So, Jeung-Ho et al., A Convenient Synthesis of Solvated and Unsolvated Anhydrous Metal Chlorides via Dehydration of Metal Chloride Hydrates with Trimethylchlorosilane, 1990, Inorganic Chemistry, vol. 29, pp. 1592-1593.

* cited by examiner

Primary Examiner—Fred M Teskin
(74) Attorney, Agent, or Firm—Fletcher Yoder

(57) ABSTRACT

The techniques disclosed provide a treatment method for passivating the interior surface of a polymerization reactor to minimize the formation of a polymer coating on the surface. The passivation is performed using a passivating agent that reacts with adsorbed water to form labile passivation products. Both the passivating agent and passivation products may be easily removed from the reactor prior to polymerization. Other embodiments provide a reactor system with a tank configured to automatically add a passivating agent to the reactor and processes for making polymers using a treated reactor.

19 Claims, 4 Drawing Sheets

KETAL

ORTHOESTER

SYSTEM AND METHOD FOR REDUCING FOULING IN A REACTOR

BACKGROUND

1. Technical Field

The present techniques generally relate to the operation and maintenance of reactors. More particularly, the present techniques relate to the reduction or inhibition of fouling of reactors, such as in polymerization reactors.

2. Description of the Related Art

This section is intended to introduce the reader to various aspects of art which may be related to various aspects of the present techniques which are described and/or claimed below. This discussion is believed to be helpful in providing the reader with background information to facilitate a better understanding of the various aspects of the present techniques. Accordingly, it should be understood that these statements are to be read in this light, and not as any indication of what subject matter may constitute prior art to the present techniques.

As chemical and petrochemical technologies have advanced, the products of these technologies have become increasingly prevalent in society. In particular, as techniques for bonding simple molecular building blocks into polymers have advanced, the polymer products, typically in the form of various plastics, have been increasingly incorporated into various everyday items. For example, polyolefin polymers, such as polyethylene, polypropylene, and their copolymers, are used for retail and pharmaceutical packaging, food and beverage packaging (such as juice and soda bottles), household containers (such as pails and boxes), household items (such as appliances, furniture, carpeting, and toys), automobile components, pipes, conduits, and various industrial products.

Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and the chemical requirements, such as thermal stability, molecular weight, and chemical reactivity, typically determine what type of polyolefin is suitable for any particular purpose.

To achieve specific performance parameters, various processes exist by which olefins may be polymerized to form polyolefins. Typically, these processes are performed at, or near, petrochemical facilities, which provide low-cost access to the short-chain olefin molecules (monomers and comonomers) such as ethylene, propylene, 1-butene, 1-pentene, 1-hexene, 1-octene, 1-decene, and other building blocks of the much longer polyolefin polymers. These monomers and comonomers may be polymerized in a liquid-phase or gas-phase polymerization reactor to form a product including polymer (polyolefin) solid particulates, typically called fluff or granules. The fluff may possess melt, physical, rheological, and/or mechanical properties of interest, such as density, melt index (MI), melt flow rate (MFR), copolymer content, comonomer content, modulus, and crystallinity. The reaction conditions within the reactor, such as temperature, pressure, chemical concentrations, polymer production rate, and so forth, may be selected to achieve the desired fluff properties.

Reactors used for the polymerization or co-polymerization of olefins (e.g., loop reactors, liquid boiling-pool reactors, gas phase reactors, etc.) can encounter operating difficulties when the polyolefin polymer product adheres to the reactor interior wall and does not dislodge or break loose from the interior wall. This condition is known as "fouling" of the reactor. Recovery from fouling generally involves removing the adhering polymer layer, e.g., by washing the reactor with hot diluent (or a solvent), blasting the reactor interior wall with various materials (e.g., sandblasting), or by water washing the reactor with relatively high-pressure water. However, such cleaning and recovery may be expensive due to the cost associated with the maintenance (cost of cleaning), the downtime of the reactor (loss of production), and the like.

Nevertheless, removal and recovery of the polymer adhered to the reactor wall is typically necessary in olefin polymerizations and other reactions because the build-up or accumulation of polymer in the reactor and on the reactor interior wall, if left intact, may reduce heat transfer through the reactor wall or even plug the reactor. For example, fouling of the reactor wall may reduce heat transfer between the contents of the reactor and a cooling medium in a reactor jacket. As would be appreciated by one of ordinary skill in the art, polymerization of olefins (e.g., terminal olefins) is an exothermic process and heat removal is generally an important function of the reactor. In addition, reactor fouling may cause other problems, such as interfering with circulation or movement of the reactor contents. For example, large masses of fouled polymer may form or break free from the reactor wall and restrict the flow of the contents in the reactor.

Fouling can occur for a number of reasons, including reactions between materials residing on the reactor wall with the monomer, catalyst, and additive components, and so forth. Further, once even a thin layer of polymer forms on the interior surfaces of the reactor walls, there is a greater tendency for additional polymer to form on the wall. In other words, a small amount of fouling may cause more fouling by acting as a site for the adhesion of more polymer chains onto the reactor wall. In addition, a layer of polymer disposed on the reactor wall may also act as a seed for further polymerization of polymer onto the reactor wall, e.g., when active catalyst remains in the polymer material adhered to the reactor wall. Therefore, it is generally desirable to avoid adhesion of the polymer to the reactor wall as much as possible.

BRIEF DESCRIPTION OF THE DRAWINGS

Advantages of the techniques may become apparent upon reading the following detailed description and upon reference to the drawings in which.

DETAILED DESCRIPTION OF SPECIFIC EMBODIMENTS

One or more specific embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Fouling in polymerization reactors and associated systems may be a significant problem in polyolefin production processes. Even in reactors constructed of inert materials such as stainless steel, that provide relatively inert surfaces, water or other contaminants may still remain within the reactor. The water or contaminants may interact with process chemicals and reactants added to the reactor for the polymerization. For example, without intending to be limiting, this problem may arise when a metallocene catalyst system is used in a polyolefin polymerization reactor, where a layer of moisture residing on an interior surface of the reactor (e.g., after the reactor has been opened for maintenance) may lead to increased fouling of the reactor after the reactor is placed back in operation. The water residing in the reactor may react with process compounds such as co-catalysts (e.g., tri-ethyl aluminum or TEA, among others) that are introduced to the reactor. In an example of such a reaction, TEA may react with the water to form ethyl aluminoxane, as shown in Equation 1 below.

Equation 1

Unfortunately, the product of the reaction in this example is a solid, ethyl aluminoxane, which may reside on and/or adhere to the interior surfaces of the reactor, participate in the on-going polymerization reaction, and promote the formation of a polymer layer on the interior surfaces, thereby preferably resulting in fouling of the reactor. Such undesirable polymer layers formed on the interior surface of the reactor may generally reduce heat transfer and cause more frequent downtime of the reactor.

The present techniques include adding treatment chemicals (i.e., passivating agents) to the reactor to passivate the reactor to remove water from the reactor, for example, water adhering to an interior surface of the reactor, while leaving substantially no passivation products or by-products residing on the surface that may contribute to further formation of polymer. The techniques may be implemented using manual or automatic systems. Further, the treatment may be performed after a reactor vessel has been opened, cleaned, and resealed to reduce fouling during and after startup. Moreover, the passivating agent may be employed in various types of polyolefin polymerization reactors.

A passivating agent may be added to a reactor by itself, in diluent (or a solvent), with reactor feed components, and so on. The passivating agent is generally added before start of polymerization, e.g., before addition of a polymerization catalyst. As mentioned, the addition of the passivating agent(s) may remove water residing on the interior surfaces of the reactor and, thus, decrease the tendency of the reactor to foul. A reduction of fouling may provide significant benefits such as increasing the time between reactor cleanings, allowing the use of more productive catalyst systems, improving heat transfer with the reactor cooling jacket, inhibiting the formation of polymer blockage in the reactor, reducing reactor downtime, and so on.

The passivating report may be supplied in cylinders, drums, railcars, and the like. The passivating agent may be stored remotely or on-site, in a neat or substantially pure form, in a blend with the diluent used for the polymerization reaction, and/or in other solvents, and so forth. The passivating agent may be stored in vessels, tanks, cylinders, drums, railcars, containers, etc. As discussed below, the passivating agent may be added to the reactor via a tank, pump, process feed streams, and/or feed system pressure, and so on. The amount of passivating agent added may depend on factors, such as the amount of moisture in the reactor.

Passivating Agents

Figure 1:
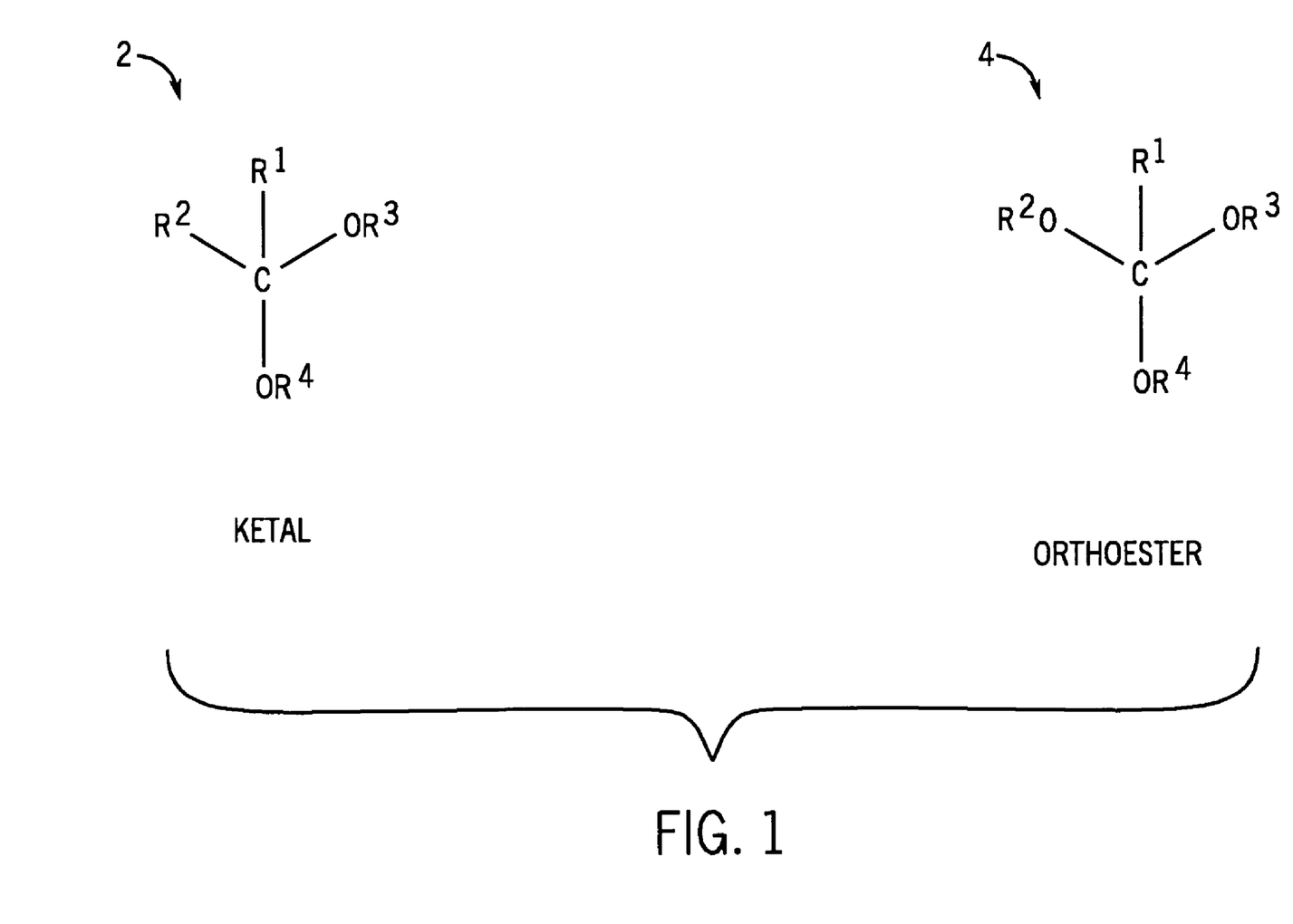
FIG. 1 shows the chemical structures of exemplary compounds that may be used in embodiments of the present techniques.

As discussed above, the various passivating agents may passivate the interior surface of a reactor by removing water and/or other reactive or corrosive agents residing on the interior surfaces. Exemplary passivating agents are shown in FIG. 1 and include ketals 2 and orthoesters 4. In each of these structures, $R^1$ may be a hydrogen or an alkyl group containing one to five carbons, and $R^2$ to $R^4$ may be independently selected to be alkyl groups containing one to five carbons or one to ten carbons. If $R^1$ in the ketal 2 is a hydrogen group, then the compound may be called an acetal, and if $R^1$ in orthoester 4 is a hydrogen group, then the compound may be called an orthoformate. These passivating agents generally react with water residing on the interior surface of a reactor to form passivation products or by-products. An exemplary ketal 2 is 2,2-dimethoxypropane, which reacts with water according to Equation 2 below.

Equation 2

Ketals that may be used in embodiments of the present techniques include, for example 2,2-dimethoxypropane, 2,2-diethoxypropane, or 2,2-dipropoxypropane, or any combination thereof. Acetals that may be used in embodiments include, for example, 1,1-dimethoxypropane, 1,1-diethoxypropane, 1,1-dipropoxypropane, 1,1-dimethoxyethane, 1,1-diethoxyethane, or 1,1-dipropoxyethane, or any combination thereof.

In another embodiment, an orthoester 4 that may be used is 1,1,1-trimethoxyethane. This orthoester 4 may react with water residing on the interior surface of a reactor according to Equation 3 below.

Equation 3

One of ordinary skill in the art will recognize that Equation 3 represents a complete hydrolysis of the 1,1,1-trimethoxyethane. Reaction of a single mole of water with the passivating agent, 1,1,1-trimethoxyethane, forms two moles of methanol and one mole of methyl acetate. The extent or conversion of this hydrolysis reaction may range from about 10% to about 100% (i.e., substantially complete hydrolysis), depending on the circumstances, such as the operating conditions and configuration of the reactor, the presence of other compounds and reactants, the intentional manipulation and control of the conversion by the operator or engineer, and so on. Orthoesters that may be used in embodiments of the present techniques include, for example: trimethylorthoformate; triethylorthoformate; tripropylorthoformate; 1,1,1-trimethylorthoacetate; 1,1,1-triethylorthoacetate; 1,1,1-tripropylorthoacetate; 1,1,1-trimethylorthopropate; 1,1,1-triethylorthopropate; or 1,1,1-tripropylorthopropate; or any combination thereof.

It is believed that the exemplary passivation reactions shown in Equations 2 and 3 may lower the tendency of a reactor to foul in at least two ways. First, the passivation products (e.g., methanol, acetone, or acetic acid) of the reactions typically do not adhere to the walls of the reactor, easing their removal from the reactor surface. Second, the passivation products generally do not react with other reactants or reagents in the reactor to form problematic by-products, such as the aluminoxane formed from the reaction of water with organoaluminum compounds, discuss with respect to Equation 1 above.

The passivating agent may be added to a reactor as a neat solution, in a solution of an organic solvent, in diluent, and the like. The organic solvent may be the typical diluent employed in the polymerization reaction, or may be other solvents which are inert to the polymerization and that may be removed from the downstream recycle gas (e.g., in the fractionation system). Examples of suitable diluents and organic solvents may include isobutane, propane, n-pentane, i-pentane, neopentane, n-hexane, cyclohexane, cyclopentane, methylcyclopentane, and ethylcyclohexane, among others.

The passivation products of the passivation reaction(s), which may include methanol, acetone, acetic acid, and so on, may be removed by displacing the contents of the reactor to the downstream diluent recovery and fractionation systems and/or to the flare. The reactor operation and its pressure may be maintained, or the reactor may be depressured, depending on the technique employed to remove the passivating agent. In general, as discussed below, the passivation products (and any remaining passivating agent) in the diluent in the reactor (e.g., circulating in the reactor) may be removed by emptying the contents of the reactor to the downstream diluent recovery and fractionation system or to the flare, rinsing or displacing the reactor with diluent, purging the reactor with nitrogen, rinsing the reactor with a solvent, and/or by adding an aluminum alkyl to the pressurized reactor (i.e., having the circulating diluent containing the passivation products), and so on.

Polyolefin Polymerization Process

In the exemplary production of polyolefin, the polymerization reactor polymerizes olefin monomer into polyolefin, and the extruder, converts the polyolefin from the reactor into polyolefin pellets. These processes are typically continuous operations. However, a variety of both continuous and batch systems may be employed throughout the polyolefin process. An exemplary nominal capacity for a typical polyolefin plant is about 600-800 million pounds of polyolefin produced per year. Exemplary hourly design rates are approximately 85,000 to 90,000 pounds of polymerized polyolefin per hour and 90,000 to 95,000 pounds of extruded polyolefin per hour. The higher capacity for the extrusion system allows the reactor to continue operations during short extruder shutdowns for various events, such as cleaning of screen packs, pelletizers, and the like. However, as an extruder may generally outpace the reactor under normal operating conditions, every period in which a reactor is not producing polymer, due to fouling or for other reasons, corresponds to a significant loss of production.

Figure 2:
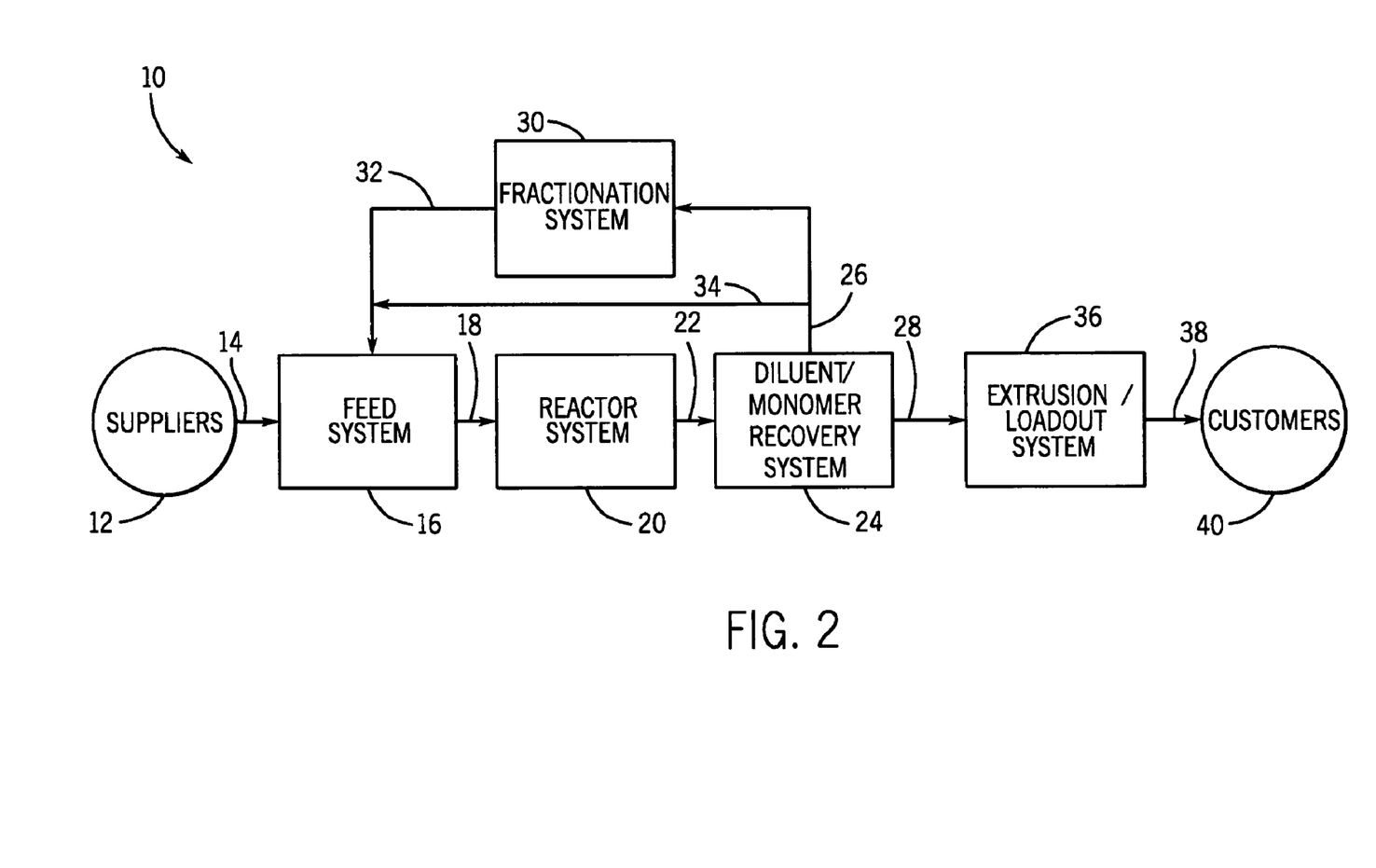
FIG. 2 is a block flow diagram depicting an exemplary polyolefin manufacturing system for producing polyolefins in accordance with embodiments of the present techniques.

The block diagram shown in FIG. 2 depicts an exemplary manufacturing process 10 for producing polyolefins, such as polyethylene homopolymer, polypropylene homopolymer, and/or various copolymers. Various suppliers 12 may provide reactor feedstocks 14 to the manufacturing system 10 via pipelines, trucks, cylinders, drums, and so forth. The suppliers 12 may include off-site and/or on-site facilities, including olefin plants, refineries, catalyst plants, and the like. Examples of possible feedstocks 14 include olefin monomers and comonomers, including such compounds as ethylene, propylene, 1-butene, 1-hexene, 1-octene, and 1-decene. Other feedstocks include diluents, such as propane, isobutane, n-hexane, and n-heptane, and chain transfer agents, such as hydrogen. Catalysts, such as Ziegler catalysts, Ziegler-Natta catalysts, chromium catalysts, and metallocene catalysts, are added to the reactor to polymerize the olefins. Typically, co-catalysts, such as triethylaluminum alkyl, triethylboron, and methyl aluminoxane are also added. In the case of ethylene monomer, exemplary ethylene feedstock may be supplied via pipeline at approximately 800-1450 pounds per square inch gauge (psig) at 45-65° F. Exemplary hydrogen feedstock may also be supplied via pipeline, but at approximately 900-1000 psig at 90-110° F. Of course, a variety of supply conditions may exist for ethylene, hydrogen, and other feedstocks 14.

Feed System

The suppliers feedstocks 14 are provided to a reactor feed system 16, where the feedstocks 14 may be stored, such as in monomer storage and feed tanks, diluent vessels, catalyst tanks, co-catalyst cylinders and tanks, and so forth. In the feed system 16, the feedstocks 14 may be treated or processed prior to their introduction as feed 18 into the polymerization reactors. For example, feedstocks 14, such as monomer, comonomer, and diluent, may be sent through treatment beds, e.g., molecular sieve beds, aluminum packing, etc., to remove catalyst poisons. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor being fed. Also, it should be noted that typically only a relatively small amount of fresh make-up diluent as feedstock 14 is utilized, with a majority of the diluent fed to the polymerization reactor recovered from the reactor effluent.

The feed system 16 may prepare or condition other feedstocks 14, such as catalysts, for addition to the polymerization reactors. For example, a catalyst may be activated and then mixed with diluent, such as isobutane or hexane, or with mineral oil in catalyst preparation tanks. Further, the feed system 16 typically provides for metering and controlling the addition rate of the feedstocks 14 into the polymerization reactor to maintain the desired reactor stability and/or to achieve the desired polyolefin properties or production rate.

Furthermore, in operation, the feed system 16 may also store, treat, and meter recovered reactor effluent for recycle to the reactor. Indeed, operations in the feed system 16 generally receive both feedstock 14 and recovered reactor effluent streams. In total, the feedstocks 14 and recovered reactor effluent are processed in the feed system 16 and fed as feed streams 18 (e.g., streams of monomer, comonomer, diluent, catalysts, co-catalysts, hydrogen, additives, or combinations thereof) to the reactor system 20.

In embodiments of the present techniques, the feed system 16 may also include an automatic system for the addition of passivating agents, such as those discussed in detail above. The addition of these passivating agents may be performed under automatic control, such as in an automated process performed during startup after a cleaning cycle. Further, the passivating agents may be added under automatic control at any point chosen, upon a signal from an operator, for example, between production of different grades of polyolefin, or after a diluent displacement or rinse, and so forth.

Reactor System

The reactor system 20 may include one or more polymerization reactors, which may in turn be of the same or different types. In the polymerization reactor vessels, one or more olefin monomers are polymerized to form a product including polymer particulates, typically called fluff or granules. The fluff may possess one or more melt, physical, rheological, and/or mechanical properties of interest, such as density, melt index (MI), melt flow rate (MFR), copolymer or comonomer content, modulus, and crystallinity. The reaction conditions, such as temperature, pressure, flow rate, mechanical agitation, product takeoff, component concentrations, polymer production rate, and so forth, may be selected to achieve the desired fluff properties.

In addition to the one or more olefin monomers, a catalyst that facilitates polymerization of the monomer is typically added to the reactor. The catalyst may be a particle suspended in the fluid medium within the reactor. In general, Ziegler catalysts, Ziegler-Natta catalysts, metallocenes, and other well-known polyolefin catalysts, as well as co-catalysts, may be used. An example of such a catalyst is a slurry containing a metallocene compound and a chemically treated solid oxide.

Further, diluent may be fed into the reactor, typically a liquid-phase reactor. The diluent may be an inert hydrocarbon that is liquid at reaction conditions, such as isobutane, propane, n-pentane, i-pentane, neopentane, n-hexane, cyclohexane, cyclopentane, methylcyclopentane, ethylcyclohexane, among others. The purpose of the diluent is generally to suspend the catalyst particles and polymer within the reactor. Some polymerization processes may not employ a separate diluent, such as in the case of selected polypropylene production where the propylene monomer itself may act as the diluent.

Furthermore, in multiple reactor systems, the reactors may be arranged serially or in parallel. To facilitate explanation of the present techniques, the following examples are limited in scope to specific reactor types believed to be familiar to those skilled in the art and to single reactors or simple combinations. To one of ordinary skill in the art using this disclosure, however, the passivation techniques described herein are applicable to more complex reactor arrangements, such as those involving additional reactors, different reactor types, and/or alternative ordering of the reactors or reactor types. Such arrangements are considered to be within the scope of the present technique.

Diluent/Monomer Recovery, Treatment, and Recycle

The discharge 22 of the reactors within system 20 may include the polymer fluff as well as non-polymer components, such as, for example, diluent, unreacted monomer/comonomer, residual catalyst, or the by-products (e.g., methanol, acetone, etc.) of the present passivation treatments. The discharge 22 may be subsequently processed, such as by a diluent/monomer recovery system 24, to separate non-polymer components 26, such as diluent, unreacted monomer, or passivation by-products from the polymer fluff 28.

The untreated recovered non-polymer components 26 may be further processed, such as by a fractionation system 30, to remove undesirable heavy and light components. Such undesirable components may include, in addition to other materials, reaction by-products, feedstock impurities, or the by-products of the passivation treatment. Fractionated product streams 32 may then be returned to the reactor system 20 via the feed system 16. On the other hand, the non-polymer components 26 may recycle more directly to the feed system 16 (as indicated by reference numeral 34), bypassing the fractionation system 30. As for the fluff 28, it may be further processed within the recovery system 24 and in the extrusion/loadout system 36, to prepare it for shipment, typically as pellets 38, to customers 40.

Extrusion/Loadout System

In the extrusion/loadout systems 36, the fluff 28 is typically extruded to produce polymer pellets 38 with the desired mechanical, physical, and melt characteristics. Extruder feed may include additives, such as UV inhibitors and peroxides, which are added to the fluff products 28 to impart desired characteristics to the extruded polymer pellets 38. An extruder/pelletizer receives the extruder feed, including one or more fluff products 28 and whatever additives have been added. The extruder/pelletizer heats and melts the extruder feed which then may be extruded (e.g., via a twin screw extruder) through a pelletizer die under pressure to form polyolefin pellets.

In general, the polyolefin pellets may then be transported to a product load-out area where the pellets may be stored, blended with other pellets, and/or loaded into railcars, trucks, bags, and so forth, for distribution to customers 40. In the case of polyethylene, pellets 38 shipped to customers 40 may include low density polyethylene (LDPE), linear low density polyethylene (LLDPE), medium density polyethylene (MDPE), high density polyethylene (HDPE), and enhanced polyethylene.

Final Products Made from Polymers

The polymer or resin fluff from the reactor system may have additives and modifiers added to provide better processing during manufacturing and for desired properties in the end product. Additives include surface modifiers such as: slip agents; antiblocks; tackifiers; antioxidants such as primary and secondary antioxidants; pigments; processing aids such as waxes/oils and fluoroelastomers; and special additives, such as fire retardants, antistats, scavengers, absorbers, odor enhancers, and degradation agents. After the addition of the additives, the polymer or resin fluff may be extruded and formed into pellets for distribution to customers and formation into final end-products.

To form end-products or components from the pellets, the pellets are generally subjected to further processing, such as blow molding, injection molding, rotational molding, blown film, cast film, extrusion (e.g., sheet extrusion, pipe and corrugated extrusion, coating/lamination extrusion, etc.), and so on. Blow molding is a process used for producing hollow plastic parts. The process typically employs blow molding equipment, such as reciprocating screw machines, accumulator head machines, and so on. The blow molding process may be tailored to meet the customer's needs, and to manufacture products ranging from the plastic milk bottles to the automotive fuel tanks mentioned above. Similarly, in injection molding, products and components may be molded for a wide range of applications, including containers, food and chemical packaging, toys, automotive, crates, caps and closures, to name a few.

Profile extrusion processes may also be used. Polyethylene pipe, for example, may be extruded from polyethylene pellet resins and used in an assortment of applications due to its chemical resistance, relative ease of installation, durability and cost advantages, and the like. Indeed, plastic polyethylene piping has achieved significant use for water mains, gas distribution, storm and sanitary sewers, interior plumbing, electrical conduits, power and communications ducts, chilled water piping, and well casings, among others. In particular, high-density polyethylene (HDPE), which generally constitutes the largest volume of the polyolefin group of plastics used for pipe, is tough, abrasion-resistant and flexible (even at subfreezing temperatures). Furthermore, HDPE pipe may be used in small diameter tubing and in pipe up to more than 8 feet in diameter. In general, polyethylene pellets (resins) may be supplied for the pressure piping markets, such as in natural gas distribution, and for the non-pressure piping markets, such as for conduit and corrugated piping.

Rotational molding is a high-temperature, low-pressure process used to form hollow parts through the application of heat to biaxially-rotated molds. Polyethylene pellet resins generally applicable in this process are those resins that flow together in the absence of pressure when melted to form a bubble-free part. Resins, such as those produced by the catalyst compositions of the present techniques, may offer such flow characteristics, as well as a wide processing window. Furthermore, these polyethylene resins suitable for rotational molding may exhibit desirable low-temperature impact strength, good load-bearing properties, and good ultraviolet (UV) stability. Accordingly, applications for rotationally-molded polyolefin resins include agricultural tanks, industrial chemical tanks, potable water storage tanks, industrial waste containers, recreational equipment, marine products, plus many more.

Sheet extrusion is a technique for making flat plastic sheets from a variety of resins. The relatively thin gauge sheets are generally thermoformed into packaging applications such as drink cups, deli containers, produce trays, baby wipe containers and margarine tubs. Other markets for sheet extrusion of polyolefin include those that utilize relatively thicker sheets for industrial and recreational applications, such as truck bed liners, pallets, automotive dunnage, playground equipment, and boats. A third use for extruded sheet, for example, is in geomembranes, where flat-sheet polyethylene material may be welded into large containment systems for mining applications and municipal waste disposal.

The blown film process is a relatively diverse conversion system used for polyethylene. The American Society for Testing and Materials (ASTM) defines films as less than 0.254 millimeter (10 mils) in thickness. However, the blown film process can produce materials as thick as 0.5 millimeter (20 mils), and higher. Furthermore, blow molding in conjunction with monolayer and/or multilayer coextrusion technologies lays the groundwork for several applications. Advantageous properties of the blow molding products may include clarity, strength, tearability, optical properties, and toughness, to name a few. Applications may include food and retail packaging, industrial packaging, and non-packaging applications, such as agricultural films, hygiene film, and so forth.

The cast film process may differ from the blown film process through the fast quench and virtual unidirectional orientation capabilities. These characteristics allow a cast film line, for example, to operate at higher production rates while producing beneficial optics. Applications in food and retail packaging take advantage of these strengths. Finally, polyolefin pellets may also be supplied for the extrusion coating and lamination industry.

Ultimately, the products and components formed from polyolefin (e.g., polyethylene) pellets may be further processed and assembled for distribution and sale to the consumer. For example, a polyethylene milk bottle may be filled with milk for distribution to the consumer, or the fuel tank may be assembled into an automobile for distribution and sale to the consumer.

Loop Slurry Reactor Systems

Figure 3:
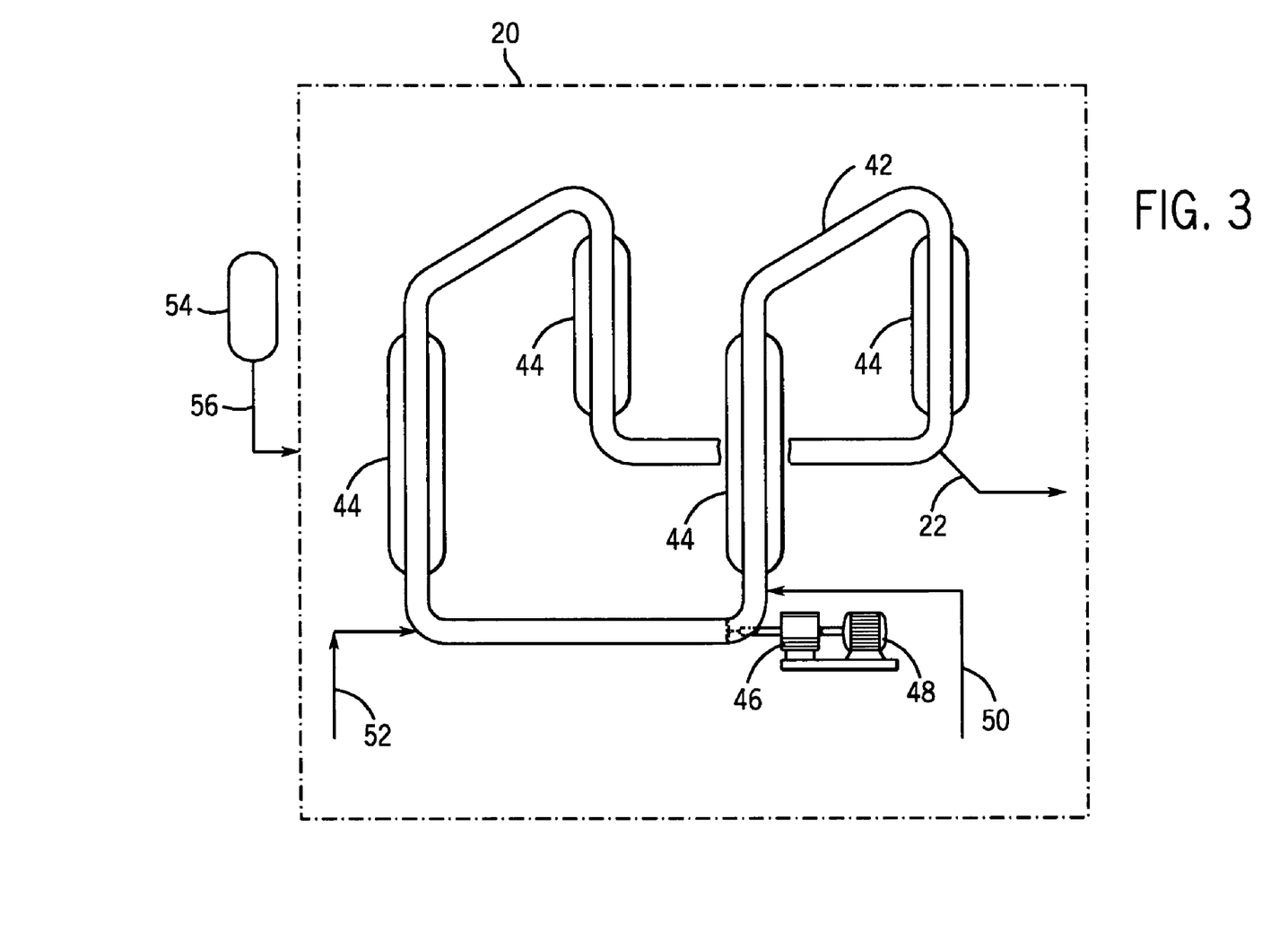
FIG. 3 is a process flow diagram of an exemplary reactor system of the polyolefin manufacturing system of FIG. 2 in accordance with embodiments of the present techniques.

Examples of reactor types that may be used in embodiments include reactors in which polymerization occurs within a liquid phase. Such liquid phase reactors may include autoclaves, boiling liquid-pool reactors, loop slurry reactors (vertical or horizontal), and so forth. FIG. 3 depicts a loop slurry reactor 42, which may be employed in the reactor system 20 and used to produce polyolefins, such as polyethylene, polypropylene, and their copolymers This example should not be considered limiting of the present techniques, however, as it should be understood that the use of the passivating agents described herein may be similarly applicable to other types of liquid phase reactors and to gas phase reactors as well.

The loop slurry reactor 42 is generally composed of segments of pipe connected by smooth bends or elbows. An exemplary reactor configuration includes eight jacketed vertical pipe legs, approximately 24 inches in diameter and approximately 200 feet in length, connected by pipe elbows at the top and bottom of the legs. As discussed below, reactor jackets 44 are normally provided to remove heat from the exothermic polymerization via circulation of a cooling medium, such as treated water, through the reactor jackets 44.

The reactor 42 may be used to carry out polyolefin polymerization under slurry conditions in which insoluble particles of polyolefin are formed in a fluid medium and are suspended as slurry until removed. A motive device, such as pump 46, circulates the fluid slurry in the reactor 42. An example of a pump 46 is an in-line axial flow pump with the pump impeller disposed within the interior of the reactor 42 to create a turbulent mixing zone within the fluid medium. The impeller may also assist in propelling the fluid medium through the closed loop of the reactor at sufficient speed to keep solid particulates, such as the catalyst or polyolefin product, suspended within the fluid medium. The impeller may be driven by a motor 48 or other motive force. As discussed above, the fluid medium within the reactor 42 may include various feedstocks, such as olefin monomers and comonomers, diluent, catalysts, co-catalysts, molecular weight control agents (e.g., hydrogen), and any other desired co-reactants or additives.

The feedstocks may be added to the reactor from the reactor feed system 16 via inlets or conduits at specified locations, such as depicted at feed stream 50, which generally correspond to one of the feed streams 18 of FIG. 2. Likewise, a catalyst, such as those previously discussed, may be added to the reactor 42 via a conduit at a suitable location, such as depicted at feed stream 52, which may include a diluent carrier and which also generally corresponds to one of the feed streams 18 of FIG. 2. In total, the added components generally compose a fluid medium within the reactor 42 within which the catalyst is a suspended particle.

Temperature is typically maintained below that level at which the polymer product would go into solution. Due to the exothermic nature of the polymerization reaction, a cooling fluid may be circulated through jackets 44 around portions of the loop slurry reactor 42 to remove excess heat, thereby maintaining the temperature within the desired range, generally between 150° F. to 250° F. (65° C. to 121° C.). Likewise, pressure may be regulated within a desired pressure range, generally 100 to 800 psig, with a range of 450-700 psig being typical.

As the polymerization reaction proceeds, a slurry of solid polymeric particulates forms within the medium. These solid polyolefin particulates may be removed from the reactor 42 via a settling leg or other means, such as a continuous take-off, as depicted by discharge stream 22. In downstream processing, the polyethylene discharged from the reactor may be extracted from the slurry and purified.

As described above, water residing on the interior surface of the reactor may contribute to the formation of fouling. This fouling may lower the efficiency of the reactor by interfering with heat transfer, plugging of the reactor, and so on. The use of passivating agents, as discussed above, may delay or prevent such fouling. The passivating agents may be stored remotely or at the reactor site. The passivating agent may be added to the reactor via a feed tank 54 and feed line 56, for example. The feed line 56 carrying the passivating agent may connect directly to an inlet on the reactor 42 or may connect to another feed stream (e.g., feed stream 52) in the feed system 16 or reactor system 20. One of ordinary skill in the art will recognize that the passivating agent may be added to tank 54 through any number of techniques, for example, by depressuring tank 54 and adding passivating agent to tank 54 from a drum (e.g., via a drum pump) provided by a supplier. The feed line 56 allows the passivating agent to be added to the reactor 42 by any suitable means that may overcome the back-pressure of the reactor 42. For example, a pumping device (e.g., positive displacement pump) may be disposed along feed line 56 and pressure the passivating agent from tank 54 into the reactor 42. Alternatively, tank 54 may be pressured higher than reactor 42 after addition of the agent to the feed tank 54, allowing the passivating agent to be injected into the reactor 42 without a pumping device. For example, the feed tank 54 may be pressurized with diluent, and the diluent used as a carrier to introduce the passivating agent via conduit 56 directly to the reactor 42 or to a feed stream (e.g., feed stream 18 of FIG. 1) of the reactor 42.

Treatment System and Procedures

Figure 4:
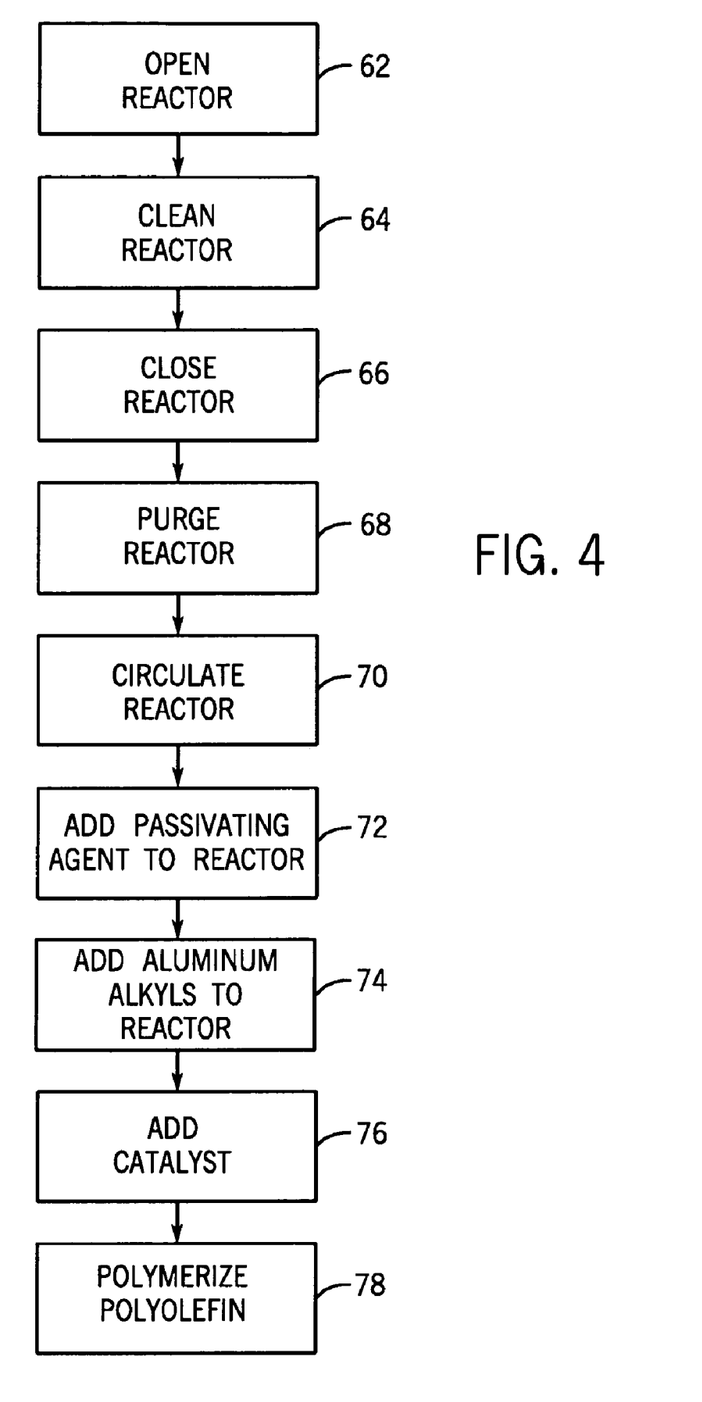
FIG. 4 is a flow chart showing an exemplary technique for removing adsorbed water from the surface of a reactor in accordance with embodiments of the present techniques.

An exemplary procedure that may be employed in the present techniques is shown in the block diagram of FIG. 4. The exemplary procedure depicted by the block diagram is for passivating a polyolefin reactor 42 after it has been opened for cleaning, maintenance, or other reasons. This procedure is merely intended as an example of one method that may be employed. One of ordinary skill in the art will recognize that other procedures and techniques may take advantage of the pretreatment with such passivating agents, where the passivating agent and any reactor products of the passivating agent may be relatively easily removed from the reactor at completion of the treatment.

Moreover, it should be noted passivation techniques may be used in reactors used for anionic polymerization, such as styrene-butadiene block copolymerization. Further, such procedures may be used in reactors used in synthesis procedures for specialty chemicals, such as in Grignard reactions. In each of these procedures, the by-products of the reaction may be removed by purging with an inert gas, by flushing with a dry diluent or solvent, or by adding an active reagent to form by-products that are not problematic for the process.

Referring to FIG. 4, a polymerization reactor may occasionally need to be opened to the atmosphere, as referenced in block 62. The opening may be performed for any number of reasons, such as inspections, upgrades, or to clean the reactor, as referenced in block 64, and the like. Cleaning the reactor may be necessitated by fouling events or may be a regular maintenance item. Once the cleaning is completed or nearly completed, the reactor is typically closed and sealed, e.g., gaskets are disposed between mating flanges and the flanges are tightened, as referenced in block 66. The majority of the water and oxygen are cleared from the reactor by purging as shown in block 68. The purging may be done with any inert gas or liquid, but is usually performed with nitrogen. The purge gas and some additional amount of water are removed by circulating diluent in the reactor, for example, as referenced in block 70. This may involve only adding diluent (used for the polymerization reaction) to the reactor, pressurizing the reactor with the diluent, and starting the circulation pump 46, as discussed with respect to FIG. 3.

However, as previously described, a small amount of water residing on the interior surface of the reactor generally cannot easily be removed by either purging with an inert gas or by circulating diluent. Although the water could be removed by heating and purging with an inert gas (e.g., nitrogen) for several days, for example this is typically economically practical for a reactor producing large amounts of a commercial product. In other words, extended downtime of the reactor may result in a severe economic penalty.

Thus, as referenced in block 72, a passivating agent may be added to the reactor to react with and remove the water residing on the interior surfaces. As described with respect to FIG. 1, above, the passivating agent may be a ketal 2, an orthoester 4, or any suitable combination thereof. The passivating agent may be added to the diluent circulating in the reactor (e.g., prior to addition of catalyst or monomer and start of the polymerization). The diluent containing the passivating agent is circulated in the reactor for a time sufficient to react with the majority of the water adsorbed or absorbed onto the walls of the reactor. In various embodiments, this time may range from a few minutes to several hours, depending on such factors as the dryness desired, or the sensitivity of the catalyst system to foul when exposed to adsorbed water, and so forth. The compound may be added to the reactor under either automatic or manual control.

In one example, once the passivating agent has had sufficient time to react with any adsorbed water, fresh diluent may be supplied to the reactor, and the reactor contents (diluent having the passivating agent and passivation products) displaced via the reactor discharge to the downstream diluent recovery and fractionation systems, where the passivation products of the passivating reactions (and any residual passivation agent) may be removed from the diluent. Alternatively, the reactor with the circulating diluent containing the passivation products may be depressured, and the contents of the reactor discharged to the flare for combustion, for example.

The depressured empty reactor may then be purged with an inert gas prior to start-up of the reactor.

As another alternative, as referenced in block 74, the reactor pressure may be maintained, and aluminum alkyls, such as, triethyl aluminum or triisobutyl aluminum, may be added to the reactor having the diluent (containing passivation products and any residual passivating agent) circulating in the reactor. The aluminum alkyls generally will react with the passivation products, forming components that are generally less problematic for the process than the by-products of reactions of aluminum alkyls with water. Such by-products of the reaction of the alkyls with the passivation products may be cleared from the reactor by displacing with fresh diluent or by purging with an inert gas, as similarly noted above. On the other hand, the passivation products may be left in the reactor and additional aluminum alkyl may be added to compensate for any decreased catalyst activity. In this situation, the by-products are carried out of the reactor with the diluent and polymer products.

Once the pre-treatment procedure is complete, the process may continue with the addition of catalyst, as referenced in block 76. Monomer may then be added to begin the polyolefin polymerization, as referenced in block 78. The polymer products and any remaining by-products of the passivation process may then be removed from the reactor, as described with respect to FIG. 2.

Examples Showing Efficacy of Pretreatment with a Passivating Agent

The following examples are set forth to provide those of ordinary skill in the art with a detailed description of how the methods disclosed herein are evaluated, and are not intended to limit the scope of the present techniques.

The efficacy of exemplary embodiments of the techniques above in reducing fouling was evaluated by running a series of tests to measure fouling in a bench scale polyethylene batch reactor before and after treatment with a passivating agent. The catalyst system employed was a metallocene system including a combination of bis(1-n-butyl-3-methylcyclopentadienyl)zirconium dichloride, triisobutylaluminum and a sulfated CTSO (chemically treated solid oxide). In comparison to many other types of catalyst systems, such as Ziegler catalysts, the tested catalyst system may have a relatively high propensity to foul when exposed to moisture. For this reason, it may be a good system for demonstrating the efficacy of the present techniques. The results obtained from the tests are shown in Table 1 and discussed below.

TABLE 1

EXAMPLE RUNS TO SHOW EFFICACY OF PASSIVATION

| RUN | 2,2-dimethoxy propane (mL) | 1-Hexene (gms) | Metallocene solution (mL) | Walls | % of Wall Covered |
|---|---|---|---|---|---|
| 1 | 2 | 0 | 1 | mostly clean | 4 |
| 2 | 0 | 0 | 1 | moderate to heavy, uneven | 50 |
| 3 | 2 | 0 | 2 | light, uneven | 7 |
| 4 | 0 | 0 | 2 | heavy, uneven | 35 |
| 5 | 2 | 150 | 2 | light, uneven | 12 |
| 6 | 0 | 150 | 2 | heavy, uneven | 38 |
| 7 | 5 | 150 | 2 | mostly clean | 12 |
| 8 | 0 | 150 | 2 | Heavy | 43 |

Reagents

The bis(1-n-butyl-3-methylcyclopentadienyl)zirconium dichloride was purchased from Boulder Scientific of Mead, Colo. Triisobutylaluminum (TIBA) was purchased as a 25-weight % solution in heptane from Akzo Chemicals of Chicago, Ill. Reagent grade heptane was dried over 5 Å mole sieve and degassed by purging with nitrogen for 10 minutes. All other reagents and polymerization feedstocks were purified by standard methods, as known in the art.

Preparation of a Chemically Treated Solid Oxide

A chemically treated solid oxide (CTSO) including a sulfated alumina may be formed by a process wherein alumina is chemically-treated with a sulfate or bisulfate source, typically selected from, but not limited to, sulfuric acid, ammonium sulfate, or ammonium bisulfate. For the tests discussed below, Alumina A, from W.R. Grace Company of Columbia, Md., was impregnated to incipient wetness with an aqueous solution of ammonium sulfate. Typically, the alumina had a surface area of about 330 square meters per gram ($m^2$/gram) and a pore volume of about 1.3 cubic centimeters per gram. The amount of ammonium sulfate used was equal to about 20% of the starting alumina. The volume of water used to dissolve the ammonium sulfate was calculated from the total pore volume of the starting sample, e.g., about 2.6 milliliters of water for each gram of alumina to be treated. Thus, a solution of about 0.08 grams of ammonium sulfate per mL of water was employed. The resulting wet sand was dried in a vacuum oven overnight at 120° C., and then screened through a 35-mesh screen. Finally, the material was activated in a fluidizing stream of dry air at 550° C. for 3 hours, in the case of bench scale samples, or 6 hours, for the larger pilot plant samples. Afterward, the alumina was collected and stored under dry nitrogen and used without exposure to the atmosphere.

Preparation of the Metallocene Solution

In all of the tests, the metallocene catalyst was dissolved in solution to prepare for addition to the bench scale reactor. In an inert atmosphere box, about 20 milligrams of the metallocene bis(1-n-butyl-3-methylcyclopentadienyl)zirconium dichloride was placed in a 60 mL Wheaton vial and sealed. The vial was removed from the box and 20 mLs of dry toluene were added by syringe.

Preparation of the Catalyst Slurry

In an inert atmosphere box, about 50 mg of sulfated CTSO were placed in a 60 mL Wheaton vial and sealed. The vial was removed from the box and about 20 mLs of dry heptane were added by syringe. The metallocene solution was added to the CTSO slurry by syringe. As described for the specific examples in Table 1, 1 mL of the metallocene was used for some tests, while 2 mL was used in other tests. To the CTSO slurry, about 0.12 milliliters (ml) of a 25 weight % solution of triisobutylaluminum (TIBA) were added at the same time as the metallocene solution, and the slurry was held for 15 minutes prior to use.

Methods for Determination of Reactor Fouling

The amount of fouling of the walls of a lab scale reactor may be determined from a photograph of the fouled reactor. For example, a transparency overlay with a line of rectangles may be placed over the photograph. The location of the line is randomly chosen around the periphery of the reactor and follows the wall of the reactor from top to bottom. The number of rectangles that overlap fouled sites is then counted and divided by the total number of rectangles to estimate the surface area of the reactor that is fouled. However, this technique may not account for the thickness of the fouling and, thus, may tend underestimate the fouling when very heavy layers are present.

The technique described above was used for the estimation of the percentage of the reactor walls covered by fouling, as shown in Table 1. The results obtained were consistent with visual observations of the fouling. One skilled in the art will recognize that other of other techniques may also be used to estimate the amount of fouling in a reactor. For example, a grid may be superimposed over the entire reactor to develop the estimate of the wall coverage. Alternatively, the fouling material may be collected and measured.

Pretreating the Reactor Significantly Reduces Fouling in Homopolymerization

The materials described above were used to run a test comparing the effects of treating with a passivating agent prior to polymerization, as shown by Runs 1 and 2 in Table 1. In Run 1, a 1 gallon Autoclave Engineer's reactor was treated with about 2 mLs of 2,2-dimethoxy-propane at ambient temperature and pressure. The reactor was sealed and about 2 liters of isobutane were added. The reactor was heated to 80° C., and after 15 minutes the contents were sent to the flare for combustion. The reactor was then purged with nitrogen and heated to 120° C. for 15 minutes.

After purging, the reactor was then blocked in at 50 pounds per square inch gauge (psig) of nitrogen and cooled below 40° C. Under a purge of isobutane, the charge port was opened and about 0.88 mLs of a 25 weight % solution of triisobutylaluminum were added, followed by the catalyst slurry, prepared as described above using 1.0 mL of the metallocene solution. The reactor was closed and then about 2 liters of isobutane were added. The reactor was heated to about 80° C. while stirring at 750 revolutions per minute (rpm). Once the reactor reached 80° C., ethylene was added to a pressure of about 355 psig. During the run, ethylene was fed on demand to maintain the pressure at about 355 psig. After 1 hour, the contents of the reactor were flared and the reactor was opened. As listed in Table 1, in Run 1 the interior wall surface of the reactor was about 4% covered by fouling.

A control run, Run 2, was made under the same polymerization conditions, but without passivation of the reactor before polymerization. In this run, the reactor was prepared by heating to 120° C. and purging with dry nitrogen for 30 minutes. After purging, the reactor was blocked in at 50 psig of nitrogen and cooled below 40° C. The polymerization was conducted as described above, using a catalyst slurry containing 1.0 mL of the metallocene solution. After the reactor was flared and opened, the reactor walls were found to have uneven areas showing a moderate to heavy polymer coating covering about 50% of the interior wall surface of the reactor. The comparison between Runs 1 and 2 demonstrates that the treatment with a passivating agent may reduce the amount of fouling on the interior components of the reactor.

Increasing the Metallocene Increases the Fouling

The tests described above were repeated using a catalyst slurry containing 2.0 mL of the metallocene solution, as shown by Runs 3 and 4, while holding all other conditions the same as in Runs 1 and 2. In Run 3, the reactor was pretreated with 2 mLs of 2,2-dimethoxypropane following the procedure of Run 1. After polymerization, the reactor walls were found to be lightly coated with polymer in one small area covering about 7% of the wall surface. In contrast to Run 3, in Run 4 the walls of the untreated reactor had uneven areas of moderate to heavy polymer coating covering about 35% of the reactor wall surface. The comparison between Runs 3 and 4 showed that while increasing the metallocene may increase the fouling, the pretreatment with a passivating agent may still be effective at preventing much of the fouling.

Pretreating the Reactor Significantly Reduces Fouling in Copolymerization

Although the determination that passivation reduces fouling in homopolymerization is significant, many grades of polyethylene require the incorporation of a comonomer to reach the desired properties. In Runs 5 and 6, the efficacy of the passivation in the prevention of fouling in copolymerization was tested. The runs were carried out in a similar fashion to those described above for Runs 1 and 2, using a catalyst slurry containing 2.0 mL of the metallocene solution. However, prior to charging the ethylene, about 150 grams of 1-hexene were added to the reactor. The ethylene was then charged to about 355 psig, and the reaction was completed as described above.

In Run 5, the walls and cooling coil of the reactor that had been pretreated with the passivating agent, 2,2-dimethoxypropane, were found to have areas that were lightly coated, with the copolymer covering about 12% of the reactor wall surface. In contrast, the untreated reactor in Run 6 showed a very heavy coating of polymer covering about 38% of the surface of the reactor walls. As the comparison between Runs 5 and 6 demonstrates, copolymerization may increase fouling of the reactor, but the use of a passivating agent may still be effective in reducing this fouling.

Increasing the Metallocene Further Increases the Fouling in Copolymerization

As a final test, Runs 7 and 8 show the effects of increasing the metallocene on the efficacy of the pretreatment with a passivating agent prior to copolymerization. The polymerizations were carried out as described above for the Runs 5 and 6, using catalyst slurry containing 2.0 mL of the metallocene solution. Further, the amount of the treatment agent, 2,2-dimethoxypropane, was increased from 2 to 5 mL for the final tests.

After polymerization, the walls of pretreated reactor, shown as Run 7, had a light coating of polymer covering about 12% of the reactor wall surface. In contrast, the untreated reactor of Run 8 was heavily fouled, with about 43% coverage of the wall surface. These tests show that increasing the concentration of a passivating agent may increase the protection from fouling.

CONCLUSIONS FROM EXAMPLES

While reactor fouling is not totally reproducible, comparison of all the examples wherein the reactor was pretreated prior to polymerization with the control runs shows that treatment with a passivating agent, such as, for example, 2,2-dimethoxypropane, may reduce fouling with this catalyst system and others susceptible to moisture. Without intending to be limiting, it is believed that the treatment may reduce the amount of water residing on the interior surfaces of the reactor, decreasing the susceptibility to fouling caused by reactions of the water with the other reactants. Accordingly, the fouling may tend to be increasingly more severe without the passivation and increasingly less severe as longer or multiple passivation procedures are carried out.

While the techniques disclosed above may be susceptible to various modifications and alternative forms, specific embodiments have been shown by way of example in the drawings. However, it should be understood that the techniques are not intended to be limited to the particular forms disclosed. Rather, the techniques encompass all modifications, equivalents and alternatives falling within the spirit and scope of the techniques as defined by the following appended claims.

What is claimed is:

1. A method for preventing fouling of a polymerization reactor, the method comprising:
treating the polymerization reactor with a passivating agent that combines with water to form a passivation product, wherein the passivating agent comprises an acetal, a ketal, or an orthoester, or any combination thereof; and
displacing the contents of the polymerization reactor with diluent after treating the polymerization reactor with the passivating agent.

2. The method of claim 1, wherein substantially no passivating agent or passivation product resides on the interior surface of the polymerization reactor upon completion of treating the polymerization reactor with the passivating agent.

3. The method of claim 1, wherein the passivating agent comprises a compound with a general formula of:

wherein $R^1$ is a hydrogen or a carbon chain of 1-10 carbons in length, $R^2$ is a carbon chain of 1-10 carbons in length, $R^3$ is a carbon chain of 1-10 carbons in length, and $R^4$ is a carbon chain of 1-10 carbons in length.

4. The method of claim 1, wherein the passivating agent comprises a compound with a general formula of wherein $R^1$ is a hydrogen or a carbon chain of 1-10 carbons in length, $R^2$ is a carbon chain of 1-10 carbons in length, $R^3$ is a carbon chain of 1-10 carbons in length, and $R^4$ is a carbon chain of 1-10 carbons in length.

5. The method of claim 1, wherein the acetal comprises 1,1-dimethoxypropane, 1,1-diethoxypropane, 1,1-dipropoxypropane, 1,1-dimethoxyethane, 1,1-diethoxyethane, or 1,1-dipropoxyethane, or any combination thereof.

6. The method of claim 1, wherein the ketal comprises 2,2-dimethoxypropane, 2,2-diethoxypropane, or 2,2-dipropoxypropane, or any combination thereof.

7. The method of claim 1, wherein the orthoester comprises:
trimethylorthoformate; triethylorthoformate; tripropylorthoformate; 1,1,1-trimethylorthoacetate; 1,1,1-triethylorthoacetate; 1,1,1-tripropylorthoacetate; 1,1,1-trimethylorthopropate; 1,1,1-triethylorthopropate; or 1,1,1-tripropylorthopropate; or any combination thereof.

8. A method for producing polyolefin, comprising:
adding a passivating agent to a polyolefin reactor, wherein the passivating agent reacts with water to form a passivation product, and wherein the passivating agent comprises an acetal, a ketal, or an orthoester, or any combinations thereof;
removing substantially all of the passivation product from the polyolefin reactor, wherein removing the passivation product from the polyolefin reactor comprises reacting the passivation product with an aluminum alkyl added to the polyolefin reactor; and
polymerizing an olefin monomer into a polyolefin in the presence of a catalyst in the polyolefin reactor.

9. The method of claim 8, wherein less than about 13% of the interior surface of the polyolefin reactor is fouled after about one hour of the polymerization of the olefin monomer into the polyolefin.

10. The method of claim 8, wherein the passivating agent comprises a compound with a general formula of wherein $R^1$ is a hydrogen or a carbon chain of 1-10 carbons in length, $R^2$ is a carbon chain of 1-10 carbons in length, $R^3$ is a carbon chain of 1-10 carbons in length, and $R^4$ is a carbon chain of 1-10 carbons in length.

11. A method of treating a loop reactor, comprising:
circulating diluent in the loop reactor; and
adding a passivating agent to the diluent circulating in the loop reactor, wherein the passivating agent reacts with water in the loop reactor to form a passivation product, and wherein substantially no passivation product resides on the interior surface of the loop reactor upon completion of the reaction of the passivating agent with the water.

12. The method of claim 11, comprising adding an aluminum alkyl to the diluent circulating in the loop reactor to react the aluminum alkyl with the passivation product.

13. The method of claim 11, comprising:
adding additional diluent to the diluent circulating in the loop reactor; and
displacing diluent containing the passivation product via a discharge of the loop reactor.

14. The method of claim 11, comprising depressuring the loop reactor to deinventory the loop reactor to remove the passivation product from the loop reactor.

15. A process for manufacturing a product comprising a polyolefin, the process comprising the act of:
manufacturing a product at least a portion of which comprises a polyolefin, wherein the polyolefin is produced by a method comprising the acts of:
treating a polymerization reactor with a passivating agent that combines with water to form a passivation product, wherein the passivating agent comprises an acetal, a ketal, or an orthoester, or any combination thereof;
contacting an olefin monomer with a catalyst composition in the treated polymerization reactor under polymerization conditions to form a polyolefin; and
displacing the contents of the polymerization reactor with diluent after treating the polymerization reactor with the passivating agent.

16. The process of claim 15, wherein substantially no residual passivating agent or passivation product resides on the interior surface of the polymerization reactor upon completion of treating the polymerization reactor with the passivating agent.

17. A method for preventing fouling of a polymerization reactor, the method comprising:
treating the polymerization reactor with a passivating agent that combines with water to form a passivation product, wherein the passivating agent comprises an acetal, a ketal, or an orthoester, or any combination thereof, and wherein the passivating agent comprises a compound with a general formula of wherein $R^1$ is a hydrogen or a carbon chain of 1-10 carbons in length, $R^2$ is a carbon chain of 1-10 carbons in length, $R^3$ is a carbon chain of 1-10 carbons in length, and $R^4$ is a carbon chain of 1-10 carbons in length.

18. A method for producing polyolefin, comprising:

adding a passivating agent to a polyolefin reactor, wherein the passivating agent reacts with water to form a passivation product, and wherein the passivating agent comprises an acetal, a ketal, or an orthoester, or any combinations thereof, and wherein the passivating agent comprises a compound with a general formula of wherein $R^1$ is a hydrogen or a carbon chain of 1-10 carbons in length, $R^2$ is a carbon chain of 1-10 carbons in length, $R^3$ is a carbon chain of 1-10 carbons in length, and $R^4$ is a carbon chain of 1-10 carbons in length;

removing substantially all of the passivation product from the polyolefin reactor; and polymerizing an olefin monomer into a polyolefin in the presence of a catalyst in the polyolefin reactor.

19. A method for producing polyolefin, comprising:

adding a passivating agent to a polyolefin reactor, wherein the passivating agent reacts with water to form a passivation product, and wherein the passivating agent comprises an acetal, a ketal, or an orthoester, or any combinations thereof;

removing substantially all of the passivation product from the polyolefin reactor, wherein removing the passivation product from the polyolefin reactor comprises displacing the passivation product from the polyolefin reactor with diluent; and polymerizing an olefin monomer into a polyolefin in the presence of a catalyst in the polyolefin reactor.

* * * * *